US008840688B2

(12) United States Patent
Star et al.

(10) Patent No.: US 8,840,688 B2
(45) Date of Patent: Sep. 23, 2014

(54) CHEMICAL PROTECTION OF METAL SURFACE

(71) Applicants: Toyota Motor Engineering & Manufacturing North America, Inc., Erlanger, KY (US); The Regents of the University of California, Oakland, CA (US)

(72) Inventors: Kurt Star, Bellflower, CA (US); John Muldoon, Saline, MI (US); Filippo Marchioni, Los Angeles, CA (US); Fred Wudl, Santa Barbara, CA (US); Bruce Dunn, Los Angeles, CA (US); Monique N. Richard, Ann Arbor, MI (US); Kimber L. Stamm Masias, Ann Arbor, MI (US)

(73) Assignees: Toyota Motor Engineering & Manufacturing North America, Inc., Erlanger, KY (US); The Regents of the University of California, Oakland, CA (US)

(*) Notice: Subject to any disclaimer, the term of this patent is extended or adjusted under 35 U.S.C. 154(b) by 0 days.

(21) Appl. No.: 14/163,536

(22) Filed: Jan. 24, 2014

(65) Prior Publication Data

US 2014/0141157 A1    May 22, 2014

Related U.S. Application Data

(63) Continuation of application No. 11/457,525, filed on Jul. 14, 2006.

(51) Int. Cl.
| | |
|---|---|
| H01M 4/13 | (2010.01) |
| H01M 4/58 | (2010.01) |
| H01M 4/38 | (2006.01) |
| B05D 5/00 | (2006.01) |
| H01M 4/04 | (2006.01) |
| H01M 4/134 | (2010.01) |
| H01M 4/02 | (2006.01) |

(52) U.S. Cl.
CPC ............... *B05D 5/00* (2013.01); *H01M 4/381* (2013.01); *H01M 4/04* (2013.01); *H01M 4/382* (2013.01); *Y02E 60/122* (2013.01); *H01M 2004/027* (2013.01); *H01M 4/134* (2013.01)
USPC ................. 29/623.5; 429/216; 429/231.95

(58) Field of Classification Search
USPC ......... 29/623.5, 623.1; 429/216, 231.95, 238, 429/246, 212, 326, 215, 137; 526/259
See application file for complete search history.

(56) References Cited

U.S. PATENT DOCUMENTS

| | | | |
|---|---|---|---|
| 6,537,698 B2 * | 3/2003 | Gan et al. ................. | 429/215 |
| 6,911,280 B1 * | 6/2005 | De Jonghe et al. ........... | 429/137 |
| 2002/0028384 A1 * | 3/2002 | Krasnov et al. .............. | 429/238 |

* cited by examiner

*Primary Examiner* — Kenneth Douyette
(74) *Attorney, Agent, or Firm* — Gifford, Krass, Sprinkle, Anderson & Citkowski, P.C.

(57) ABSTRACT

An electrochemical cell includes an anode having a metal material having an oxygen containing layer. The electrochemical cell also includes a cathode and an electrolyte. The anode includes a chemically bonded protective layer formed by reacting a D or P block precursor with the oxygen containing layer.

21 Claims, 8 Drawing Sheets

CHEMICAL PROTECTION OF METAL SURFACE

CROSS REFERENCE TO RELATED APPLICATIONS

This application is a continuation of U.S. patent application Ser. No. 11/457,525 filed Jul. 14, 2006.

FIELD OF THE INVENTION

The invention relates to chemical protection of a metal surface.

BACKGROUND OF THE INVENTION

Electrochemical cells containing a metallic anode, a cathode and a solid or solvent-containing electrolyte are known in the art. Such batteries have limitations over repeated charge/discharge cycles and may have drops in their charge and discharge capacity over repeated cycles as compared to their initial charge and discharge capacity. Additionally, an initial capacity of solid batteries is often less than desirable. There is therefore a need in the art for an improved battery having a high initial capacity and that maintains such a capacity on repeated charge and discharge cycles.

Another problem associated with electrochemical cells is the generation of dendrites over repeat charge and discharge cycles. Dendrites may be formed on the anode when the electrochemical cell is charged. The dendrite may grow over repeated cycles and lead to a reduced performance of the battery or a short circuit not allowing the charge and discharge of the battery. There is therefore a need in the art for a battery and electrode with an improved cycle life and limits the formation of a dendrite.

SUMMARY OF INVENTION

An electrochemical cell includes an anode having a metal material having an oxygen containing layer. The electrochemical cell also includes a cathode and an electrolyte. The anode includes a chemically bonded protective layer formed by reacting a D or P block precursor with the oxygen containing layer.

DETAILED DESCRIPTION OF THE PREFERRED EMBODIMENTS

Figure 1:
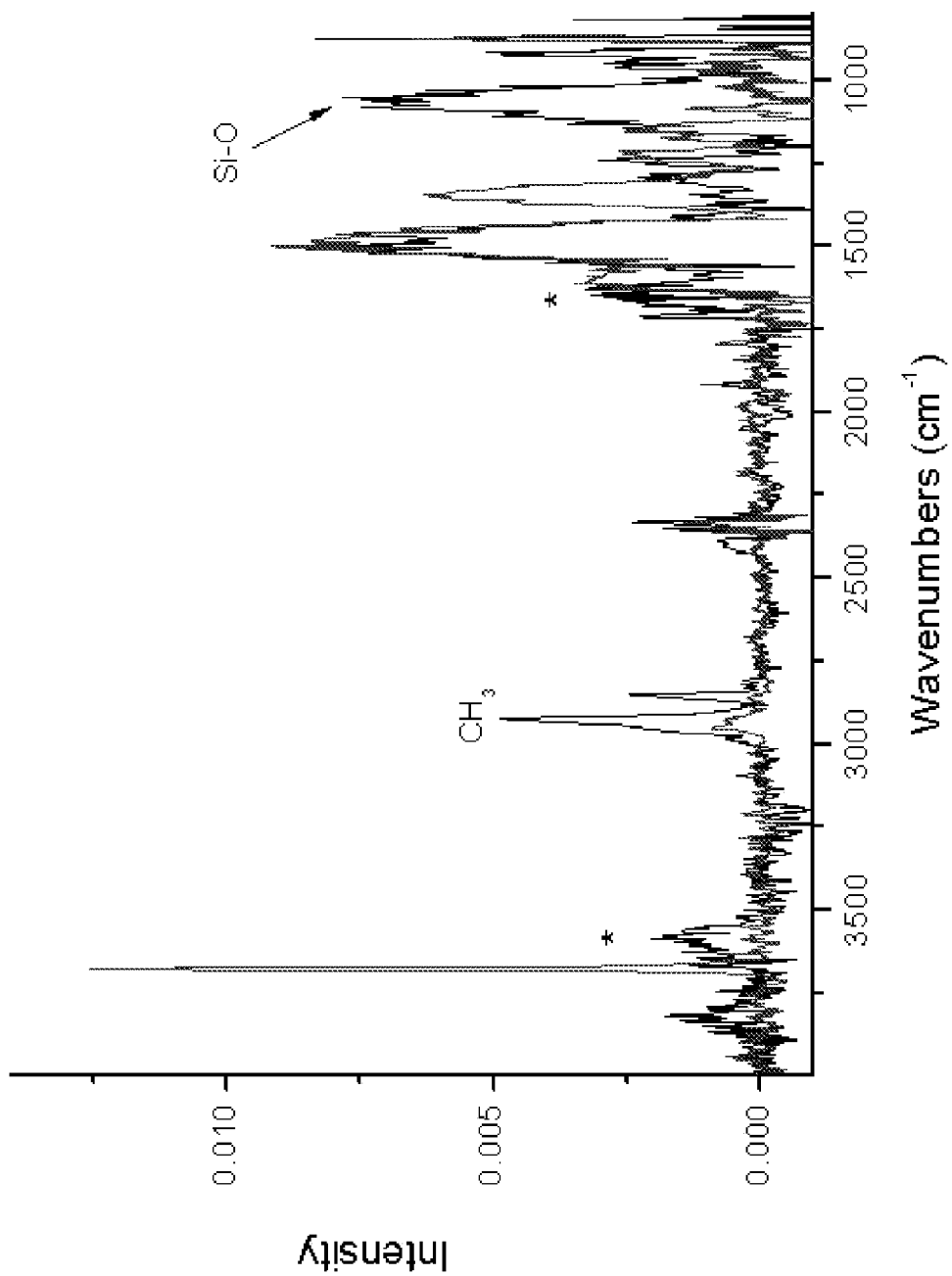
FIG. 1 is a IR spectroscopy plot of the wavelength versus the intensity for a lithium metal before and after application of the protective layer.

The term electrochemical cell as used herein refers to a device having an anode, cathode and an ion-conducting electrolyte interposed between the two. The electrochemical cell may be a battery, capacitor or other such device. The battery may be of a primary or secondary chemistry. The battery may have a solid electrolyte or a liquid electrolyte. The term anode as used herein refers to an electrode, which oxidizes during a discharge cycle.

There is disclosed an electrochemical cell having an anode including a metal material having an oxygen containing layer. The anode metal material may be alkaline metals or alkaline earth metals as indicated in the periodic table. Non-limiting examples of metal materials include: lithium, aluminum, sodium, and magnesium. In a preferred aspect of the invention the metal material is lithium.

The oxygen containing layer may be formed by exposing the metal material to the atmosphere or may otherwise be formed on the metal material. The electrochemical cell also includes a cathode, which may be formed of any suitable material. An electrolyte is interposed between the anode and cathode and may be of any suitable form including solid electrolytes liquid electrolytes and gel polymer electrolytes, which are a polymer matrix swollen with solvent and salt. Solid electrolytes could be polymer-type, inorganic layer or mixtures of these two. Examples of polymer electrolytes include, PEO-based, and PEG based polymers. Inorganic electrolytes could be composed of sulfide glasses, phosphide glasses, oxide glasses and mixtures thereof. An example of a liquid electrolyte includes carbonate solvent with dissolved metal-ion salt, for example 1M LiPF6 in ethylene carbon/diethyl carbonate (EC/DEC).

The anode of the electrochemical cell includes a chemically bonded protective layer formed thereon by reacting a D or P block precursor with the oxygen containing layer. The term D or P block precursor includes compounds that have elements in the D or P block of the periodic table. Examples of D or P block elements include phosphorus, boron, silicon, titanium, molybdenum, tantalum, vanadium to name a few. The D or P block precursor may be an organo-metallic compound. Examples of organo-metallic compounds include: inter-metallic compounds, alloys and metals having organic substituents bonded thereon. In a preferred aspect of the invention D or P block precursors may include silicon, boron or phosphorous. The D or P block precursors react with the oxygen containing layer of the metal material to form the protective layer.

In one embodiment, the D or P block precursor may be a chemical compound of the formula: $AR^1R^2X$ wherein A is selected from phosphorous or boron, X is a halogen or halogen containing compound and $R^1$ is selected from halogens, alkyl groups having from 1 to 20 carbons, alkoxy groups containing 1 to 20 carbons, or aromatic groups having from 1 to 20 carbons, $R^2$ is selected from halogens, alkyl groups having from 1 to 20 carbons, alkoxy groups containing 1 to 20 carbons, or aromatic groups having from 1 to 20 carbons.

The halogen may be chlorine, bromine, fluorine, and iodine. The alkyl, alkoxy, and aromatic groups may be fluorinated or partially fluorinated.

The alkyl group may be methyl, ethyl, n-propyl, isopropyl, n-butyl, isobutyl, sec-butyl, tert-butyl, tert-pentyl, iso-octyl, tert-octyl, 2-ethyhexyl, nonyl, decyl, undecyl, cyclopentyl, cyclohexyl, cycloheptyl, cyclooctyl, 1-methylcyclopentyl, 1-methylcyclohexyl, 1-methylcyclohexyl, and 1-methyl-4-isopropylcyclohexyl, although other alkyl groups not listed may be used by the invention. The alkyl group may also be functionalized. Suitable functional groups include: ether, sulfide, sulfoxide to name a few.

The aromatic group may be phenyl groups, phenyl groups having alkyl substituents in the para, meta or ortho position, and polyaromatic compounds. Examples of suitable polyaromatic compounds include naphthalene derivatives.

In another embodiment of the invention, the D or P block precursor may be a chemical compound of the formula: $AR^1R^2R^3R^4X$ wherein A is phosphorous, X is a halogen or halogen containing compound and $R^1$ is selected from halogens, alkyl groups having from 1 to 20 carbons, alkoxy groups containing 1 to 20 carbons, aromatic groups having from 1 to 20 carbons, or oxygen $R^2$ is selected from halogens, alkyl groups having from 1 to 20 carbons, alkoxy groups containing 1 to 20 carbons, aromatic groups having from 1 to 20 carbons, or oxygen, $R^3$ is selected from halogens, alkyl groups having from 1 to 20 carbons, alkoxy groups containing 1 to 20 carbons, aromatic groups having from 1 to 20 carbons, or oxygen, $R^4$ is selected from halogens, alkyl groups having from 1 to 20 carbons, alkoxy groups containing 1 to 20 carbons, aromatic groups having from 1 to 20 carbons, or oxygen.

In the case where the compound includes double bonded oxygen or other double bonded substituent, the number of R groups may be less than four total.

As with the previously described embodiment, the description of the halogens, alkyl, alkoxy and aromatic groups are the same and are not repeated.

In another embodiment of the invention, the D or P block precursor may be a chemical compound of the formula: $SiR^1R^2R^3X$ wherein, X is a halogen or halogen containing compound and $R^1$ is selected from hydrogen, halogens, alkyl groups having from 1 to 20 carbons, alkoxy groups containing 1 to 20 carbons, or aromatic groups having from 1 to 20 carbons, $R^2$ is selected from hydrogen, halogens, alkyl groups having from 1 to 20 carbons, alkoxy groups containing 1 to 20 carbons, or aromatic groups having from 1 to 20 carbons, $R^3$ is selected from hydrogen, halogens, alkyl groups having from 1 to 20 carbons, alkoxy groups containing 1 to 20 carbons, or aromatic groups having from 1 to 20 carbons.

As with the previously described embodiments, the description of the halogens, alkyl, alkoxy and aromatic groups are the same and are not repeated.

EXAMPLES

In the experiments detailed in the examples section, lithium metal strips were exposed to various precursor compounds. The lithium strips were placed in a sealed flask at room temperature in an inert atmosphere containing the precursor compound. The strips were exposed to the precursor a suitable period of time for the precursor to react with the metal oxygen containing layer on the lithium to form the protective layer. Various analysis procedures were performed including: impedance tests, IR spectroscopy tests, and differential scanning calorimetry tests on the various samples.

Example 1

An untreated sample of the lithium metal and a sample treated with chlorotrimethyl silane for 240 seconds according to the above procedure were analyzed using IR spectroscopy, as shown in FIG. 1. The peak corresponding to a lithium hydroxide bond is shown in the 3600 cm-1 range for the untreated sample. This peak is not shown for the treated sample which includes a peak in the 1100 cm-1 range corresponding to a silicon oxygen bond. This relationship indicates the precursor compound has reacted with the metal oxygen containing to form a silicon oxygen bond.

Example 2

Figure 2:
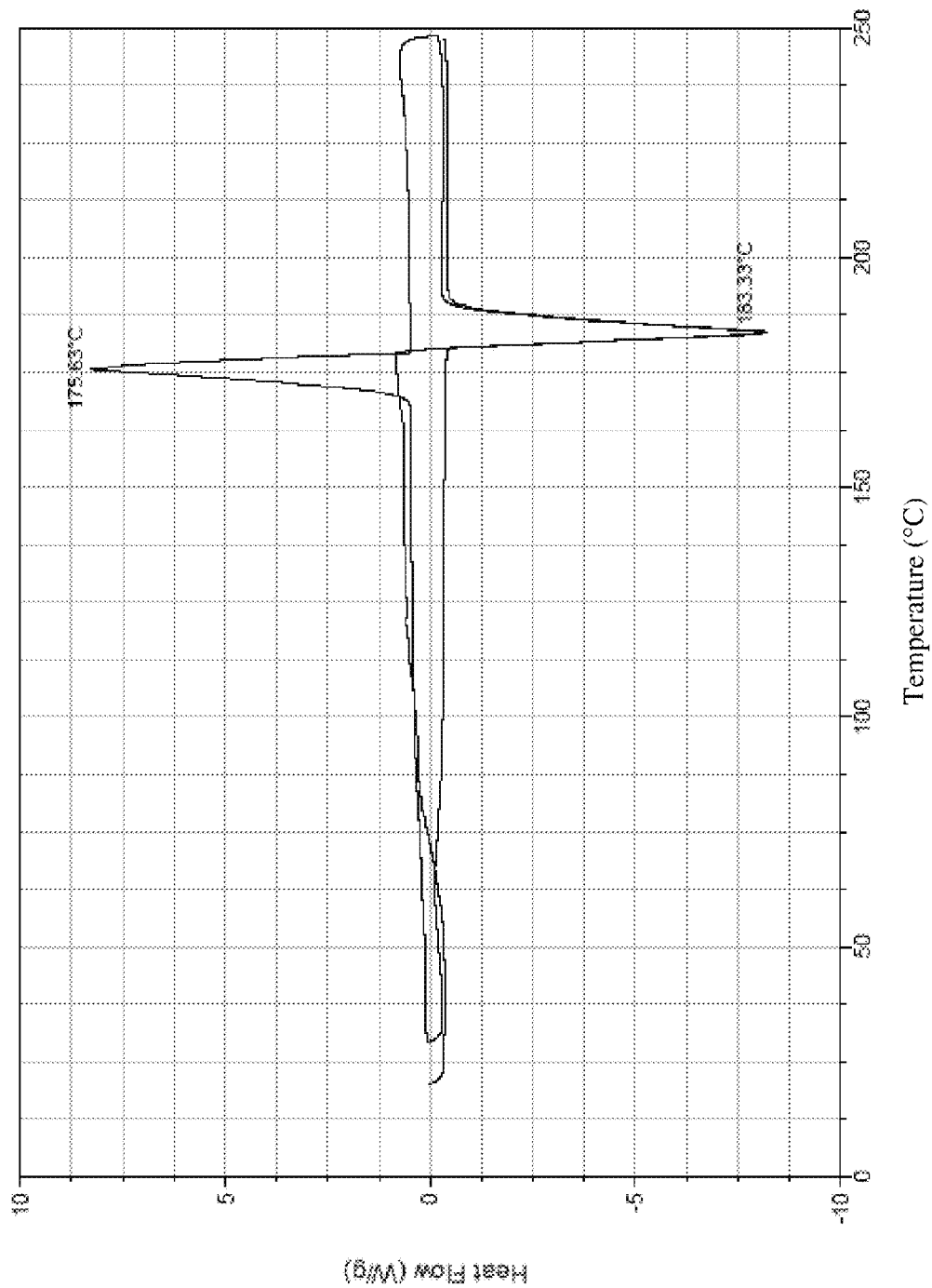
FIG. 2 is a differential scanning calorimetry plot for a lithium metal having the protective layer.

An untreated sample of the lithium metal and a sample treated with chlorotrimethyl silane according to the above procedure were analyzed using differential scanning calorimetry, as shown in FIG. 2. The samples were placed in aluminum pans with nitrogen gas flowing around the samples. The samples were heated to above the melting point and cooled below the melting point repetitively to determine whether the lithium was protected from the environment. The untreated lithium sample reacted with the aluminum pan and did not show melting and solidification representative of pure lithium metal. The treated sample, as shown in FIG. 2, exhibits very clear melting and solidification of lithium at or very near the melting point of lithium (the slight amount of superheating or supercooling at the melting point is heating rate dependent). The narrow peaks indicate that the lithium metal is protected and has not reacted with its environment in contrast to the unprotected sample.

Example 3

Figure 3:
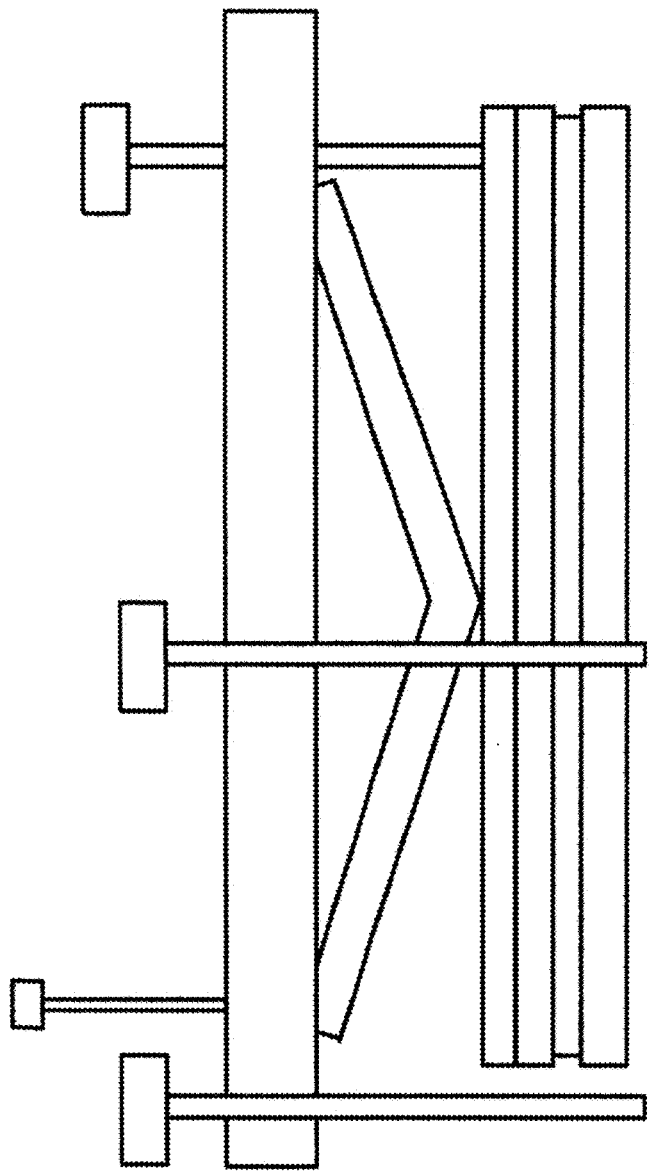
FIG. 3 is a diagram of an experimental setup for impedance testing.
Figure 4:
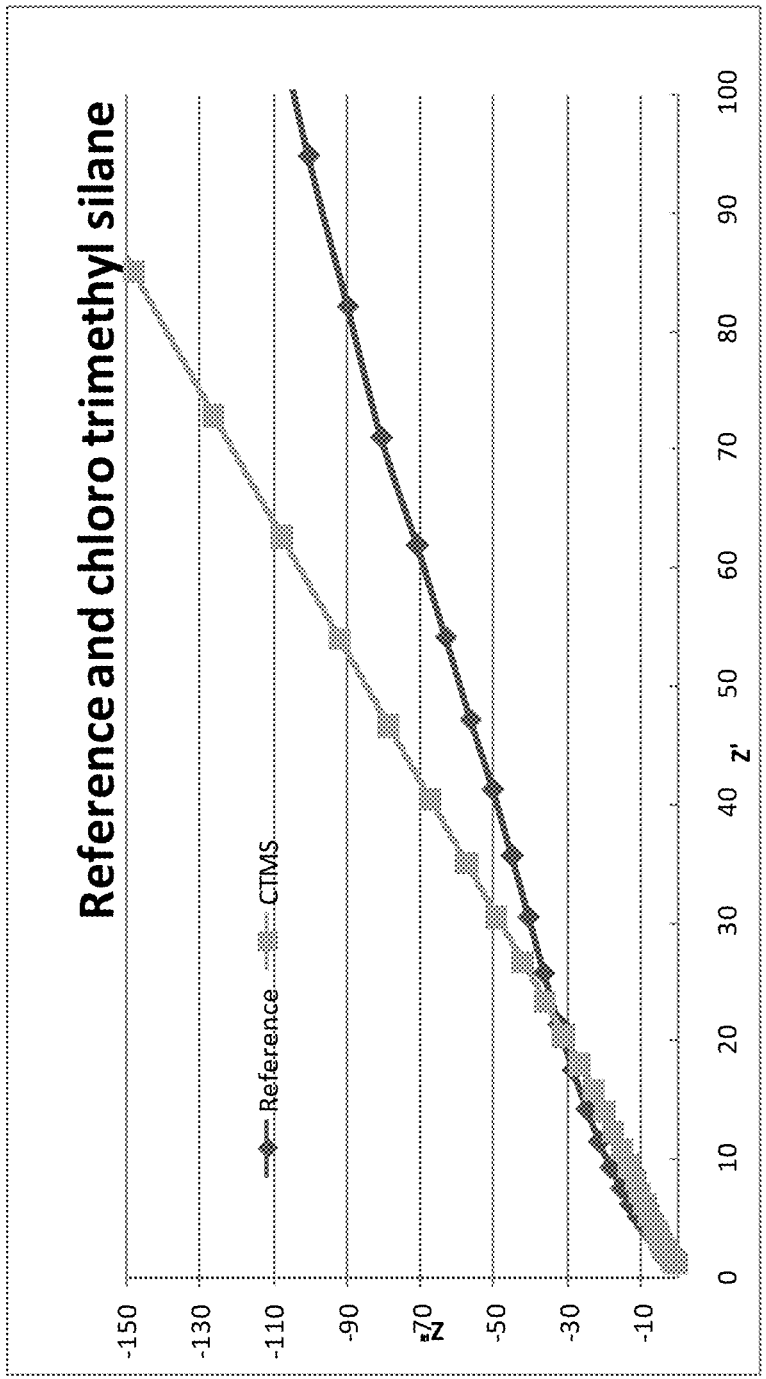
FIG. 4 is a plot of the impedance for chlorotrimethylsilane precursor forming a protective layer and a reference material.
Figure 5:
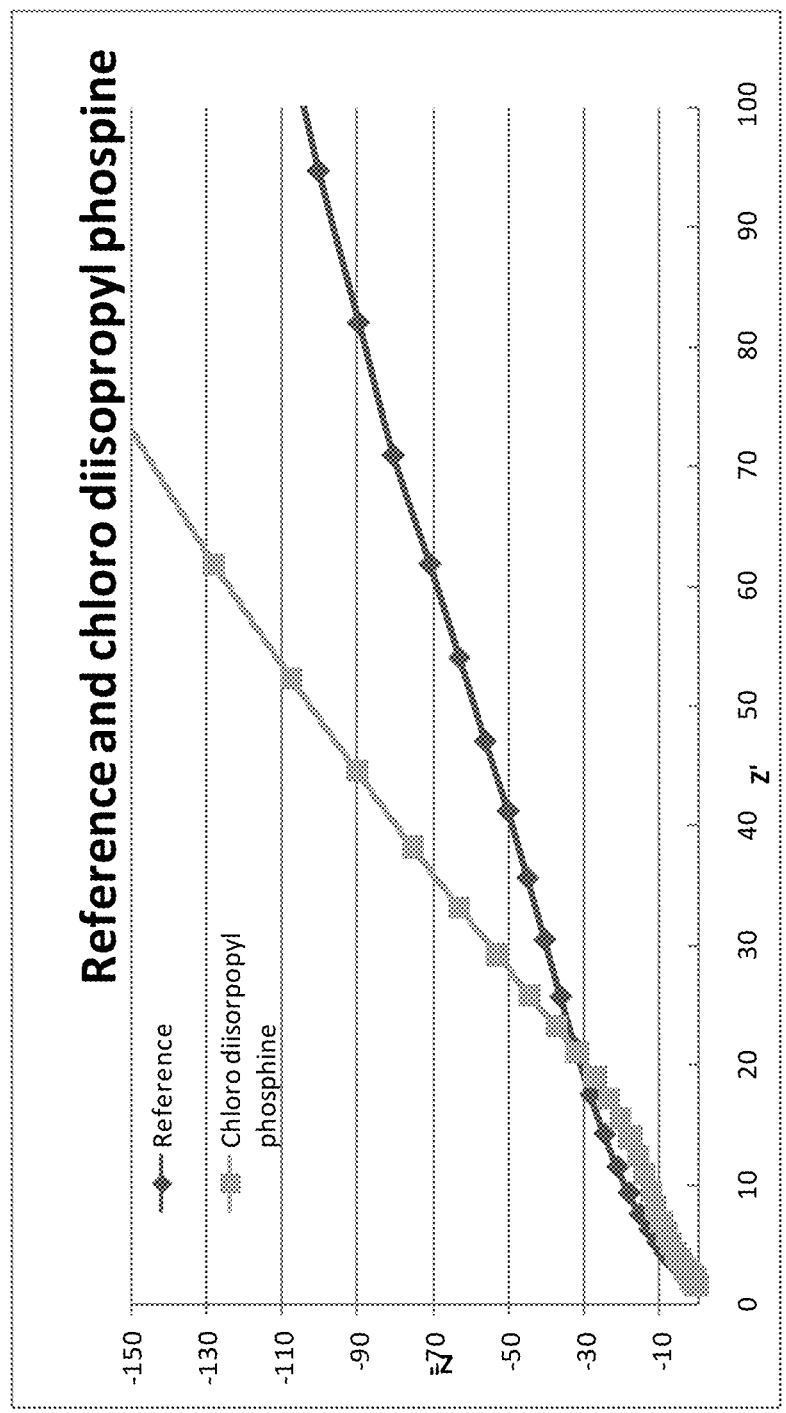
FIG. 5 is a plot of the impedance for chlorodiisopropylphosphine precursor forming a protective layer and a reference material.
Figure 6:
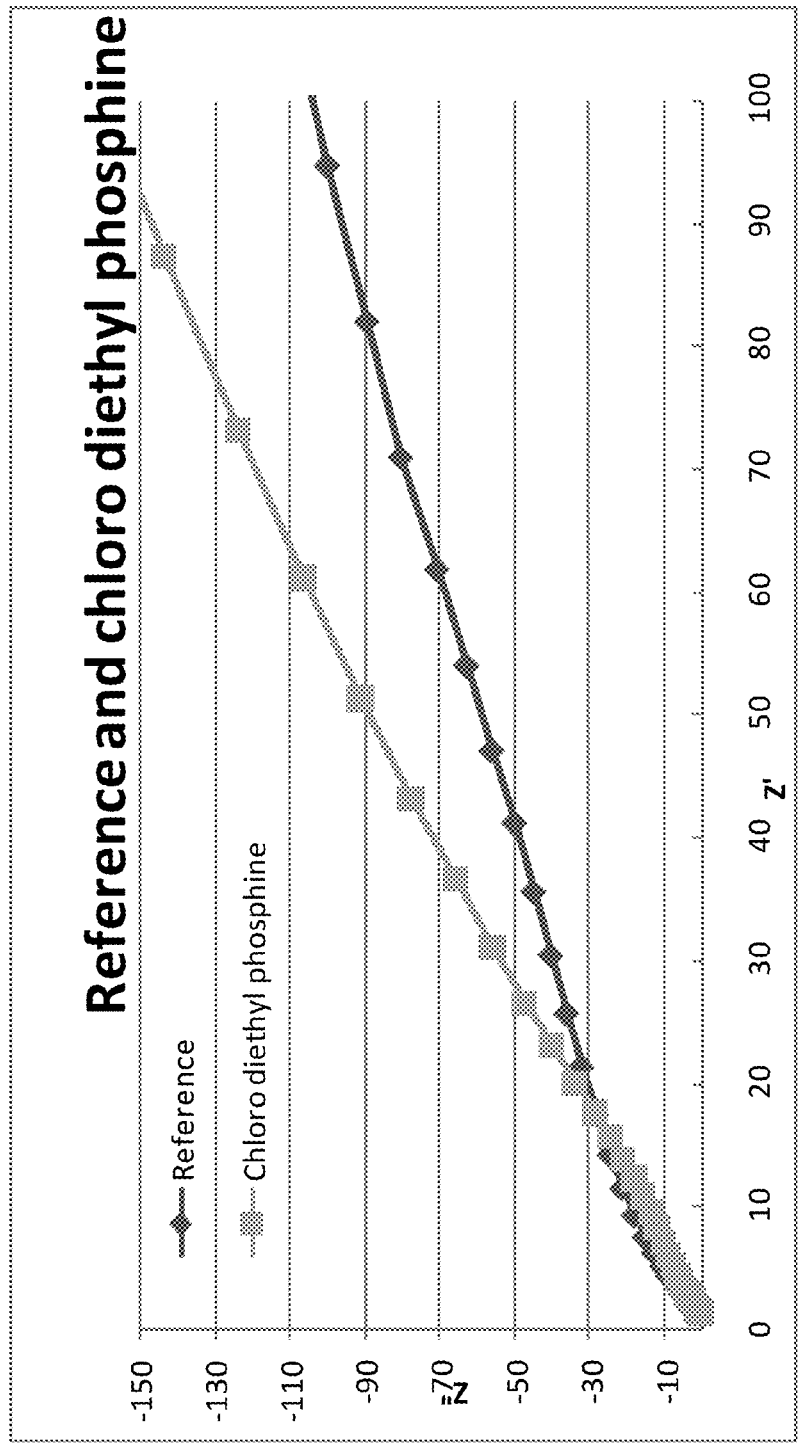
FIG. 6 is a plot of the impedance for chlorodiethylphosphine precursor forming a protective layer and a reference material.
Figure 7:
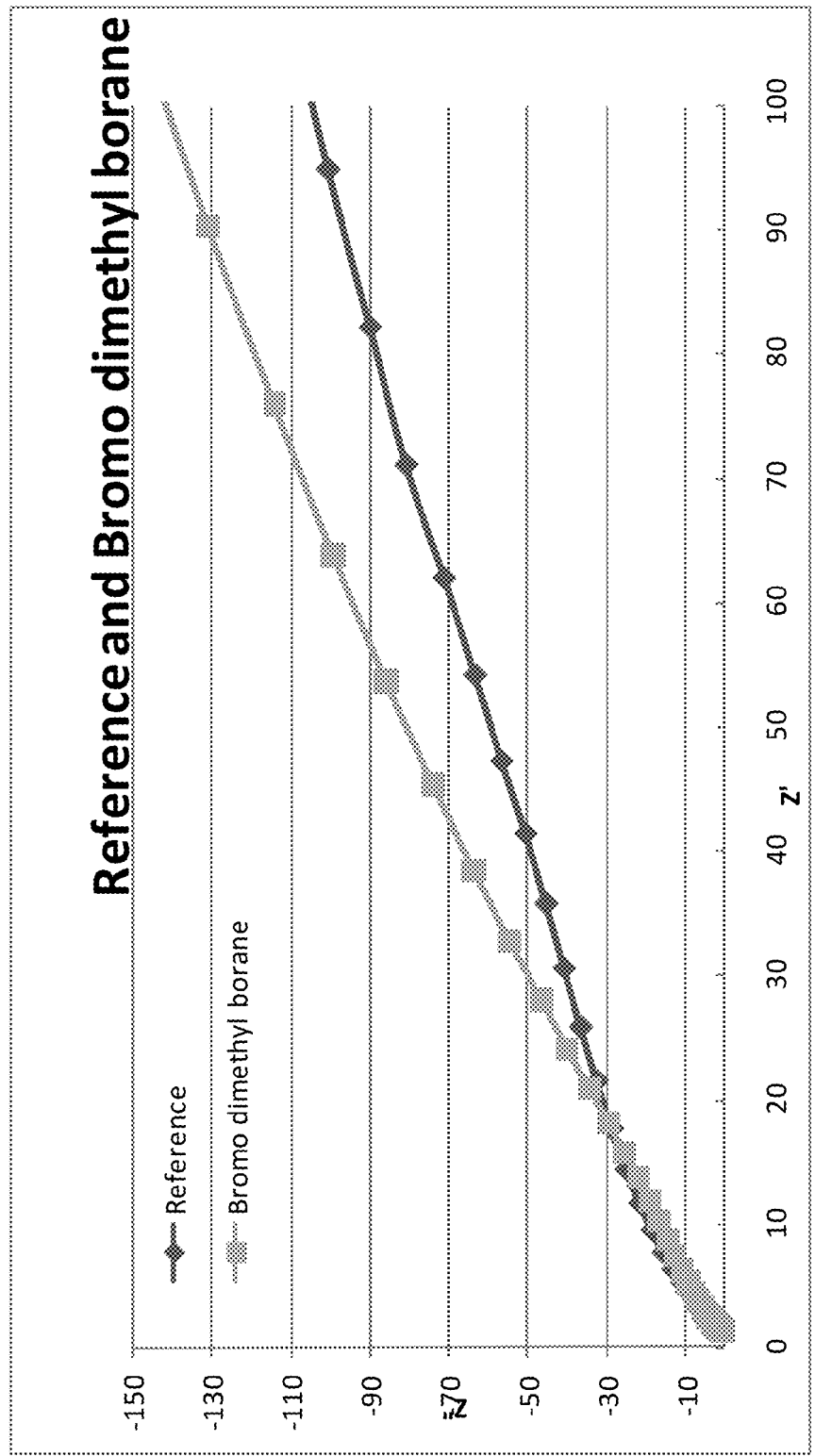
FIG. 7 is a plot of the impedance for bromodimethylborane precursor forming a protective layer and a reference material.
Figure 8:
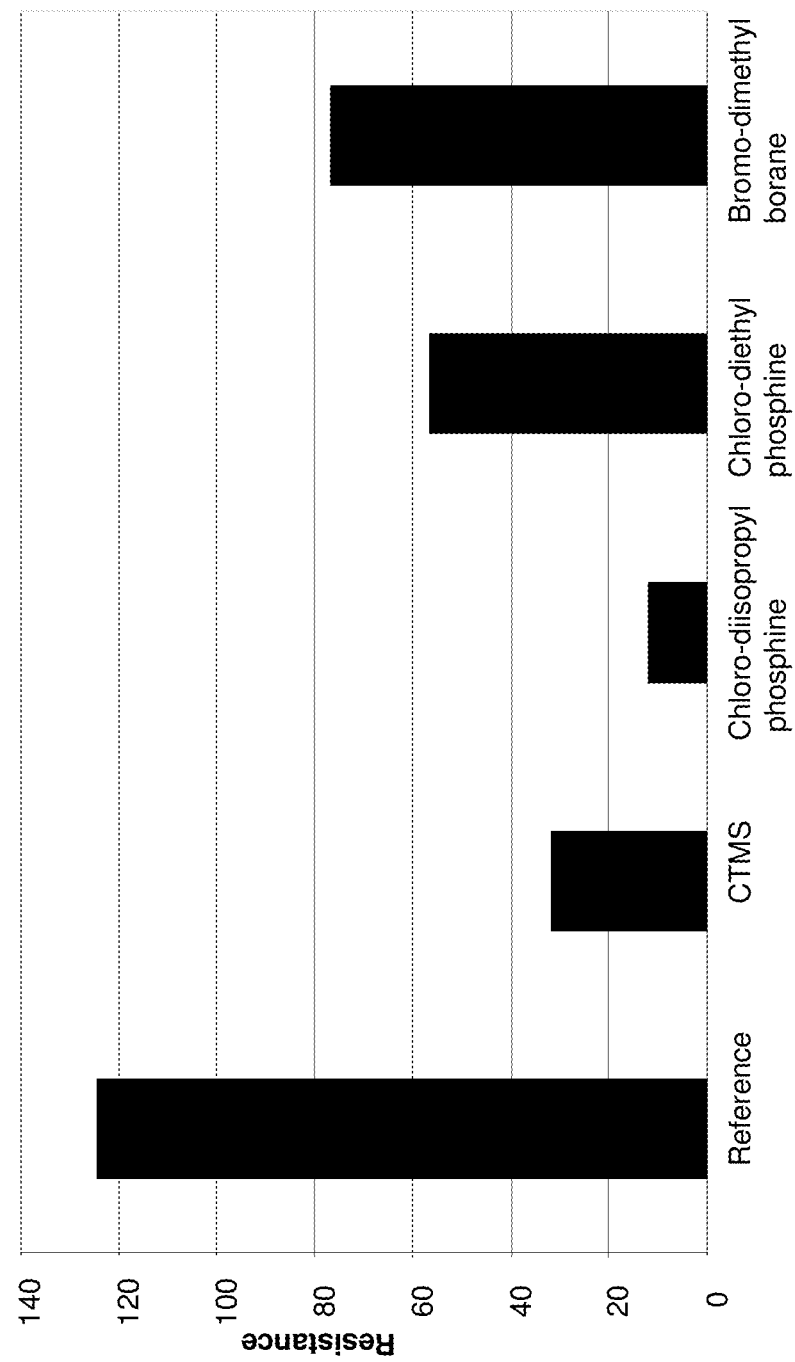
FIG. 8 is a plot of the resistance for chlorotrimethylsilane, chlorodiisopropylphosphine, chlorodiethylphosphine, bromodimethylborane precursor forming a protective layer and a reference material.

Impedance tests were performed on various treated samples of lithium and untreated lithium as a reference. The experimental setup used is shown in FIG. 3. The various samples were formed using the procedure described above. The lithium samples were tested in the experimental setup with the sample placed in the positive electrode position. The impedance plots for various samples are shown in FIGS. 4-7. FIG. 4 shows the impedance plot for a sample treated with a chlorotrimethylsilane precursor forming a protective layer. FIG. 5 is a plot of the impedance for a chlorodiisopropylphosphine precursor forming a protective layer. FIG. 6 is a plot of the impedance for a chlorodiethylphosphine precursor forming a protective layer. FIG. 7 is a plot of the impedance for a bromodimethylborane precursor forming a protective layer. As can be seen in the figures the treated samples all have an impedance curve with a slope less than the reference samples. This behavior indicates an improved performance in comparison to the untreated samples. The impedance values were used to calculate a resistance of the various samples, which are displayed in FIG. 8 for the various samples. As can be seen in the figure, the resistance for all the treated samples is less than the untreated reference. The various elements and R groups of the precursor material has an affect on the resistance of the samples. The chlorodiisopropylphosphine sample shows the lowest resistance of the treated samples. A lower resistance metal material is desirable for use as an anode in an electrochemical cell.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for forming an anode for an electrochemical cell comprising the steps of:
   providing a metal material having an oxygen containing layer;
   providing a D or P block precursor;
   forming a protective layer by reacting the D or P block precursor with the oxygen containing layer.

2. The process of claim 1 wherein the D or P block precursor is an organo-metallic compound.

3. The process of claim 1 wherein the metal material is selected from alkaline metals, and alkaline earth metals.

4. The process of claim 1 wherein the metal material comprises lithium.

5. The process of claim 1 wherein the D or P block precursor comprises a chemical compound of the formula: $AR^1R^2X$ wherein A is selected from phosphorous or boron, X is a halogen or halogen containing compound and $R^1$ is selected from halogens, alkyl groups having from 1 to 20 carbons, alkoxy groups containing 1 to 20 carbons, or aromatic groups having from 1 to 20 carbons, $R^2$ is selected from halogens, alkyl groups having from 1 to 20 carbons, alkoxy groups containing 1 to 20 carbons, or aromatic groups having from 1 to 20 carbons.

6. The process of claim 5 wherein the halogen is selected from chlorine, bromine, fluorine, and iodine.

7. The process of claim 5 wherein the alkyl, alkoxy, and aromatic groups may be fluorinated or partially fluorinated.

8. The process of claim 5 wherein the alkyl group is functionalized.

9. The process of claim 5 wherein the alkyl group is selected from methyl, ethyl, n-propyl, isopropyl, n-butyl, isobutyl, sec-butyl, tert-butyl, tert-pentyl, iso-octyl, tert-octyl, 2-ethyhexyl, nonyl, decyl, undecyl, cyclopentyl, cyclohexyl, cycloheptyl, cyclooctyl, 1-methylcyclopentyl, 1-methylcyclohexyl, 1-methylcyclohexyl, and 1-methyl-4-isopropylcyclohexyl.

10. The process of claim 5 wherein the aromatic group is selected from phenyl groups, phenyl groups having alkyl substituents in the para, meta or ortho position, and polyaromatic compounds.

11. The process of claim 1 wherein the D or P block precursor comprises a chemical compound of the formula: $AR^1R^2R^3R^4X$ wherein A is phosphorous, X is a halogen or halogen containing compound and $R^1$ is selected from halogens, alkyl groups having from 1 to 20 carbons, alkoxy groups containing 1 to 20 carbons, aromatic groups having from 1 to 20 carbons, or oxygen, $R^2$ is selected from halogens, alkyl groups having from 1 to 20 carbons, alkoxy groups containing 1 to 20 carbons, aromatic groups having from 1 to 20 carbons, or oxygen, R3 is selected from halogens, alkyl groups having from 1 to 20 carbons, alkoxy groups containing 1 to 20 carbons, aromatic groups having from 1 to 20 carbons, or oxygen, R4 is selected from halogens, alkyl groups having from 1 to 20 carbons, alkoxy groups containing 1 to 20 carbons, aromatic groups having from 1 to 20 carbons, or oxygen.

12. The process of claim 11 wherein the halogen is selected from chlorine, bromine, fluorine, and iodine.

13. The process of claim 11 wherein the alkyl, alkoxy, and aromatic groups may be fluorinated or partially fluorinated.

14. The process of claim 11 wherein the alkyl group is functionalized.

15. The process of claim 11 wherein the alkyl group is selected from methyl, ethyl, n-propyl, isopropyl, n-butyl, isobutyl, sec-butyl, tert-butyl, tert-pentyl, iso-octyl, tert-octyl, 2-ethyhexyl, nonyl, decyl, undecyl, cyclopentyl, cyclohexyl, cycloheptyl, cyclooctyl, 1-methylcyclopentyl, 1-methylcyclohexyl, 1-methylcyclohexyl, and 1-methyl-4-isopropylcyclohexyl.

16. The process of claim 1 wherein the D or P block precursor comprises a chemical compound of the formula: $SiR^1R^2R^3X$ wherein, X is a halogen or halogen containing compound and $R^1$ is selected from hydrogen, halogens, alkyl groups having from 1 to 20 carbons, alkoxy groups containing 1 to 20 carbons, or aromatic groups having from 1 to 20 carbons, $R^2$ is selected from hydrogen, halogens, alkyl groups having from 1 to 20 carbons, alkoxy groups containing 1 to 20 carbons, or aromatic groups having from 1 to 20 carbons, $R^3$ is selected from hydrogen, halogens, alkyl groups having from 1 to 20 carbons, alkoxy groups containing 1 to 20 carbons, or aromatic groups having from 1 to 20 carbons.

17. The process of claim 16 wherein the halogen is selected from chlorine, bromine, fluorine, and iodine.

18. The process of claim 16 wherein the alkyl, alkoxy, and aromatic groups may be fluorinated or partially fluorinated.

19. The process of claim 16 wherein the alkyl group is functionalized.

20. The process of claim 16 wherein the alkyl group is selected from methyl, ethyl, n-propyl, isopropyl, n-butyl, isobutyl, sec-butyl, tert-butyl, tert-pentyl, iso-octyl, tert-octyl, 2-ethyhexyl, nonyl, decyl, undecyl, cyclopentyl, cyclohexyl, cycloheptyl, cyclooctyl, 1-methylcyclopentyl, 1-methylcyclohexyl, 1-methylcyclohexyl, and 1-methyl-4-isopropylcyclohexyl.

21. A process of preparing an electrochemical cell comprising the steps of:
   providing a cathode;
   providing an electrolyte;
   providing an anode including a metal material having an oxygen containing layer;
   providing a D or P block precursor;
   forming a protective layer on the anode by reacting the D or P block precursor with the oxygen containing layer.

* * * * *